(12) United States Patent
Singh et al.

(10) Patent No.: US 11,710,494 B2
(45) Date of Patent: Jul. 25, 2023

(54) METHOD AND APPARATUS FOR DETERMINING PERIODS OF EXCESSIVE NOISE FOR RECEIVING SMART SPEAKER VOICE COMMANDS

(71) Applicant: ROVI GUIDES, INC., San Jose, CA (US)

(72) Inventors: Gyanveer Singh, Bangalore (IN); Sukanya Agarwal, Haryana (IN); Vikram Makam Gupta, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 120 days.

(21) Appl. No.: 17/166,210

(22) Filed: Feb. 3, 2021

(65) Prior Publication Data

US 2021/0158831 A1 May 27, 2021

Related U.S. Application Data (63) Continuation of application No. 16/357,198, filed on Mar. 18, 2019, now Pat. No. 10,943,598.

(51) Int. Cl.
*G10L 21/0216* (2013.01)
*G10L 15/22* (2006.01)

(52) U.S. Cl.
CPC .......... *G10L 21/0216* (2013.01); *G10L 15/22* (2013.01); *G10L 2015/223* (2013.01); *G10L 2021/02168* (2013.01)

(58) Field of Classification Search
CPC .............. G06F 3/04842; G06F 16/683; G06F 3/04847; G06Q 10/10; G09G 5/12; G10K 11/17885; G10L 15/16; G10L 15/22; G10L 21/0216; G10L 25/51; G10L 25/78; G10L 25/84; G10L 2015/223; G10L 2021/02168; G10L 15/02; G10L 25/21; B25J 13/003; H04K 3/46; H04L 12/2814

See application file for complete search history.

(56) References Cited

U.S. PATENT DOCUMENTS

| | | | |
|---|---|---|---|
| 6,178,399 B1 | 1/2001 | Takebayashi et al. | |
| 7,552,054 B1 | 6/2009 | Stifelman et al. | |
| 9,131,294 B2 | 9/2015 | Bright | |
| 9,286,942 B1 * | 3/2016 | Hayes | G06F 16/683 |
| 9,437,186 B1 | 9/2016 | Liu et al. | |
| 9,442,692 B2 * | 9/2016 | McCarthy | H03G 3/32 |
| 9,484,030 B1 | 11/2016 | Meaney et al. | |
| 9,509,269 B1 * | 11/2016 | Rosenberg | H03G 3/32 |
| 9,787,273 B2 * | 10/2017 | Iyer | H03G 3/3089 |
| 10,365,887 B1 | 7/2019 | Mulherkar | |
| 10,674,265 B1 * | 6/2020 | Lee | H03G 3/32 |

(Continued)

*Primary Examiner* — Gerald Gauthier
(74) *Attorney, Agent, or Firm* — Haley Guiliano LLP (57) ABSTRACT

Methods and systems for determining periods of excessive noise for smart speaker voice commands. An electronic timeline of volume levels of currently playing content is made available to a smart speaker. From this timeline, periods of high content volume are determined, and the smart speaker alerts users during periods of high volume, requesting that they wait until the high-volume period has passed before issuing voice commands. In this manner, the smart speaker helps prevent voice commands that may not be detected, or may be detected inaccurately, due to the noise of the content currently being played.

20 Claims, 4 Drawing Sheets

(56) References Cited

U.S. PATENT DOCUMENTS

| | | |
|---|---|---|
| 10,748,543 B2 | 8/2020 | Mixter et al. |
| 10,943,598 B2 * | 3/2021 | Singh .................. G10L 21/0216 |
| 11,150,869 B2 * | 10/2021 | Lee .......................... G10L 15/22 |
| 11,200,890 B2 * | 12/2021 | Dunning .................. G10L 25/84 |
| 11,323,086 B2 * | 5/2022 | Friant ..................... G10L 25/78 |
| 2003/0023432 A1 | 1/2003 | Kyomitsu |
| 2005/0171664 A1 | 8/2005 | Konig |
| 2008/0107286 A1 | 5/2008 | Nakajima |
| 2012/0210230 A1 * | 8/2012 | Matsuda ............. G06F 3/04842 |
| | | 715/723 |
| 2013/0191743 A1 * | 7/2013 | Reid ................... G06F 3/04847 |
| | | 715/716 |
| 2013/0246921 A1 * | 9/2013 | Meijer ..................... G09G 5/12 |
| | | 715/735 |
| 2014/0372126 A1 | 12/2014 | Ady |
| 2015/0052089 A1 * | 2/2015 | Kozloski ................ G06Q 10/10 |
| | | 706/12 |
| 2015/0280669 A1 * | 10/2015 | Vilermo ........... G10K 11/17885 |
| | | 381/107 |
| 2016/0093291 A1 | 3/2016 | Kim |
| 2016/0211817 A1 | 7/2016 | Krishnaswamy |
| 2016/0379632 A1 | 12/2016 | Hoffmeister et al. |
| 2016/0379638 A1 | 12/2016 | Basye et al. |
| 2017/0178627 A1 | 6/2017 | Firby et al. |
| 2017/0295427 A1 | 10/2017 | Shin |
| 2018/0096690 A1 | 4/2018 | Mixter et al. |
| 2018/0197533 A1 * | 7/2018 | Lyon ....................... G10L 15/16 |
| 2018/0211665 A1 | 7/2018 | Park et al. |
| 2018/0322896 A1 | 11/2018 | Tanaka et al. |
| 2018/0325470 A1 | 11/2018 | Fountaine |
| 2018/0349093 A1 * | 12/2018 | McCarty .................. G10L 15/22 |
| 2019/0173687 A1 * | 6/2019 | MacKay ............ H04L 12/2814 |
| 2019/0198007 A1 * | 6/2019 | Guo ........................ G10L 25/84 |
| 2019/0304442 A1 | 10/2019 | Hayashida et al. |
| 2019/0362715 A1 | 11/2019 | Aggarwal et al. |
| 2020/0027452 A1 | 1/2020 | Rangarajan et al. |
| 2020/0260186 A1 * | 8/2020 | Stachura .................. H04K 3/46 |
| 2020/0279575 A1 | 9/2020 | Unno |
| 2020/0302947 A1 * | 9/2020 | Singh ...................... G10L 15/22 |
| 2020/0349946 A1 | 11/2020 | Howard et al. |
| 2021/0158831 A1 * | 5/2021 | Singh .................. G10L 21/0216 |

\* cited by examiner

METHOD AND APPARATUS FOR DETERMINING PERIODS OF EXCESSIVE NOISE FOR RECEIVING SMART SPEAKER VOICE COMMANDS

CROSS-REFERENCE TO RELATED APPLICATIONS

This application is a continuation of U.S. patent application Ser. No. 16/357,198, filed Mar. 18, 2019. The disclosure of which is hereby incorporated by reference herein in its entirety.

BACKGROUND

This disclosure relates generally to smart speakers, and more specifically to determining periods of excessive noise for receiving smart speaker voice commands.

SUMMARY

The desire for easy and rapid access to online resources has led to the development of electronic personal assistants that provide users a voice-driven interface for requesting and receiving data and other services. Personal assistants, or smart speakers, typically combine speakers and microphones with an Internet connection and processing capability, all in a relatively small housing, to provide a device that users can place in many convenient locations to detect and answer verbal user requests.

Smart speakers are, however, not without their drawbacks. For example, as smart speakers rely on microphones to detect audible voice commands, they are often unable to pick up voice commands in environments with excessive background noise. In particular, smart speakers are often placed in close proximity to media content players such as televisions. User voice commands can thus be drowned out by television volume, particularly during periods of loud content.

Accordingly, to overcome this deficiency in the ability of smart speakers to detect voice commands, systems and methods are described herein for a computer-based process that determines when periods of excessive noise from nearby content players may interfere with the detection of smart speaker voice commands, and signals users when then these periods of excessive noise are occurring, so that they may delay or repeat their voice commands once the excessive noise has passed. More specifically, the smart speaker is given access to a timeline of volume levels of content currently playing on its nearby media playback device. With this information, the smart speaker determines those periods during which displayed content is likely of sufficient volume to interfere with detection of voice commands. The smart speaker then informs users of these periods of excessive noise, so that they can delay or repeat their voice commands after the noise has passed. In this manner, smart speakers improve their accuracy in detecting voice commands by preventing such voice commands from occurring at times during which they would be difficult to accurately detect.

In more detail, smart speakers determine when periods of excessive background noise may interfere with reception of voice commands, by accessing an electronic timeline of volume levels of content being played back by a nearby media playback device. The timeline lists content volume levels as a function of time during which the content is being played. From this timeline, smart speakers then may determine periods of excessive noise, i.e. periods during which content audio volume exceeds a particular measure, and periods of acceptable noise, i.e. periods during which content audio volume falls below this particular measure. During or near these periods of excessive noise, the smart speakers generate some indicator to users, signaling them to delay their voice commands until the period of excessive noise passes. Similarly, during or near periods of acceptable noise, the smart speakers can generate another indicator to users, signaling them to issue voice commands if they desire.

Various different methods may be employed to indicate periods of excessive noise. In one such method, smart speakers generate one indicator during periods of excessive noise, and another indicator at other times. Such indicators may be, for example, audible instructions or light sources that indicate instructions when illuminated. The indicators can indicate simply which period is presently occurring, or may also relay additional information such as a request to delay voice commands by a predetermined amount of time.

The indicators may be generated at various times. The indicators may simply be generated during their corresponding time periods: one indicator is generated during excessive noise periods, and the other indicator is generated at other times (i.e., periods of acceptable noise level). Alternatively, smart speakers may also generate their excessive noise indicator a short while before an excessive noise period is to begin, to prevent users from uttering a voice command that gets interrupted by a loud noise period before the command is finished. More specifically, the excessive noise indicator may be generated both during excessive noise periods and during some predetermined time period prior to those excessive noise periods.

Smart speakers can also switch to generating their acceptable noise indicators before an excessive noise period has ended. More specifically, when excessive noise periods are so long that preventing users from speaking for that amount of time is simply impractical, smart speakers may generate an acceptable noise indicator during some or all of those excessive noise periods. This prevents situations in which users are requested to refrain from voice commands for so long that user annoyance occurs. Thus, for example, during early portions of a long period of excessive noise, the smart speaker would generate its acceptable noise indicator, so that users can speak during early parts of a loud noise period. Alternatively, the acceptable noise indicator may be generated during some other portion of the loud noise period, such as the last portion or some intermediate portion thereof, to allow users a chance to speak.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to a system that predicts when volume levels of currently-playing content are sufficiently high as to interfere with detection of smart speaker voice commands Conventional smart speaker systems listen for voice commands at any time, including times when excessive background noise interferes with the accurate detection of these voice commands. As a result, some voice commands go undetected, or are interpreted in inaccurate manner. This is especially the case when a smart speaker is placed in close proximity to a media player. When the media player displays high-volume content, such as during a movie action scene, the excessive volume may prevent the smart speaker from accurately detecting and interpreting voice commands. In short, smart speakers placed near media players often have trouble accurately processing voice commands during times when the media players are playing loud content.

To remedy this situation, the system makes available an electronic timeline of volume levels of content currently being played. From this timeline, the system determines those times when the displayed content will be too loud for smart speaker voice commands. Users are warned when these high-volume periods are occurring, so that they may wait for quieter periods to issue their voice commands In this manner, users are led to avoid voice commands that will not be properly detected by the smart speaker, leading to improved accuracy in receiving and interpreting smart speaker voice commands.

Figure 1:
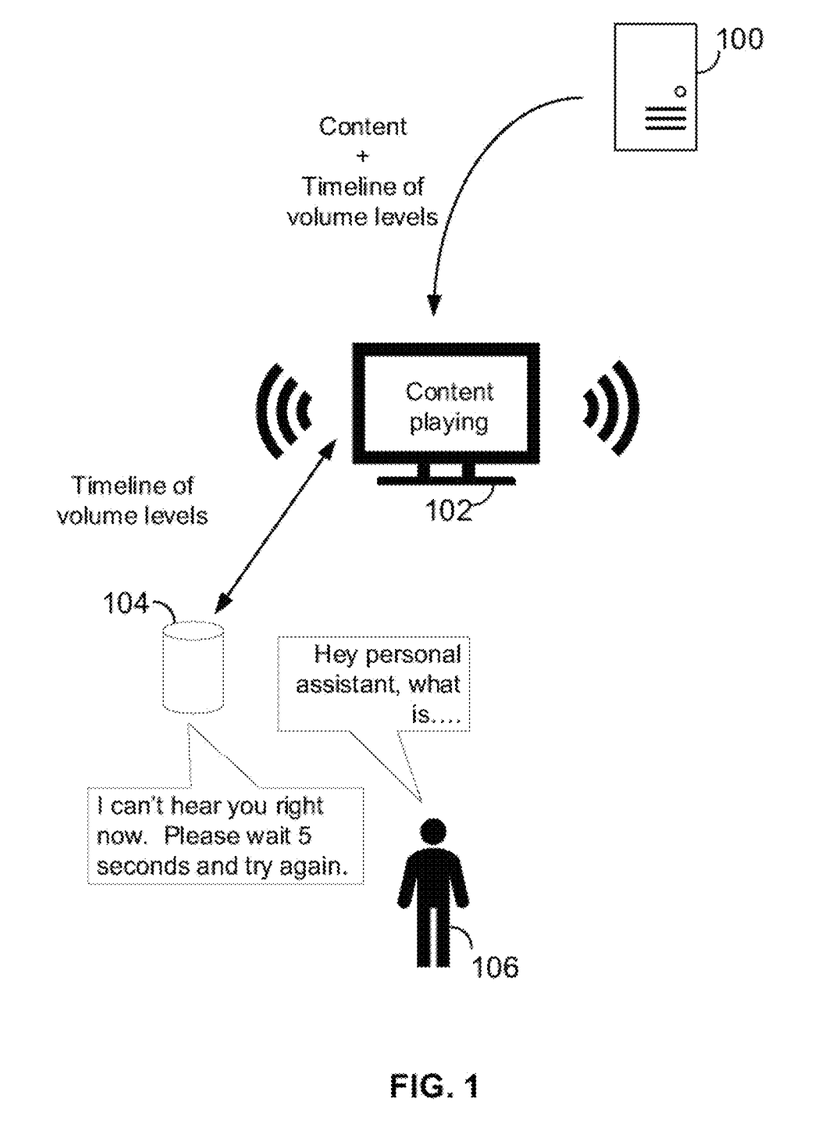
FIG. 1 is a conceptual illustration of an exemplary smart speaker in operation according to embodiments of the disclosure.

FIG. 1 illustrates an exemplary smart speaker system operating according to embodiments of the disclosure. Here, a content server 100 transmits content in electronic form to a content player 102 such as a television, which plays the content for user 106. An electronic personal assistant or smart speaker 104 is located in proximity to both the content player 102 and user 106, e.g., all three may be located in the same room. Along with the currently-displayed content, the content server 100 also transmits a timeline of volume levels of this content to content player 102. The content player 102 forwards this timeline on to smart speaker 104, which reads the timeline volume levels and corresponding times to determine when the displayed content will be loud. During these loud times, the smart speaker 104 then broadcasts an indicator that it is currently too loud to accurately detect voice commands In the example of FIG. 1, when the user 106 attempts to issue a voice command to the smart speaker 104 when the content playing on player 102 is determined to be loud, smart speaker 104 issues an audible indicator that it is currently too loud for voice commands—"I can't hear you right now."

The smart speaker 104 may also tell the user when the current loud period will end. More specifically, the smart speaker 104 determines, from the electronic timeline, periods of high-volume content. The smart speaker 104 thus is informed of when exactly periods of loud content will occur, and how long they each last. As a result, the smart speaker 104 can also inform user 106 when it is safe to issue a voice command again, i.e. when the current loud period will end: "Please wait 5 seconds and try again."

Figure 2:
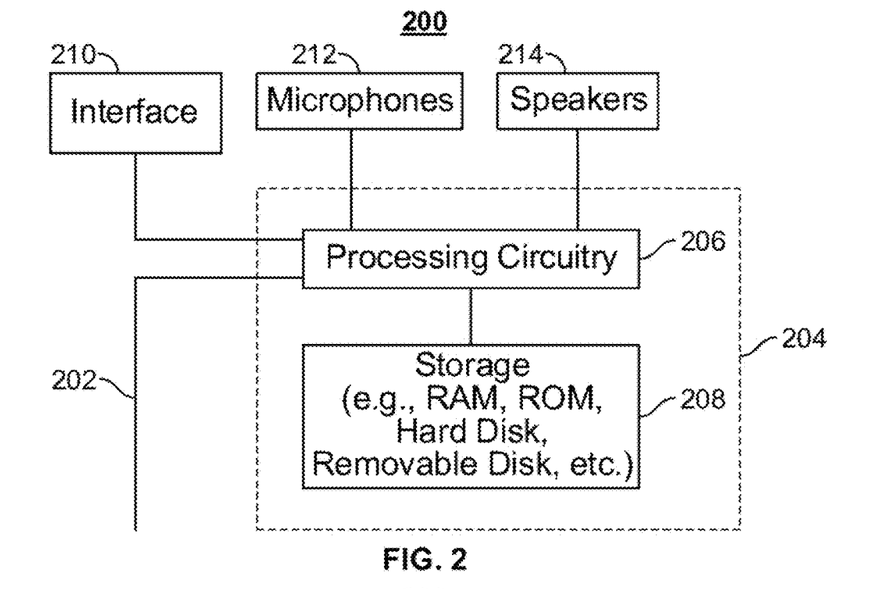
FIG. 2 is a generalized embodiment of an illustrative smart speaker constructed for use according to embodiments of the disclosure.

FIG. 2 shows a generalized embodiment of an illustrative smart speaker device 200 capable of performing such searches and displaying corresponding results. The smart speaker device 200 is a more detailed illustration of smart speaker 104 of FIG. 1.

Smart speaker device 200 may receive content and data via input/output (hereinafter "I/O") path 202. I/O path 202 may provide audio content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths, but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for a personal assistant application stored in memory (i.e., storage 208). Specifically, control circuitry 204 may be instructed by the personal assistant application to perform the functions discussed above and below. For example, the personal assistant application may provide instructions to control circuitry 204 to process and interpret voice commands received from microphones 212, and to respond to these voice commands such as by, for example, transmitting the commands to a central server or retrieving information from the Internet, both of these being sent over I/O path 202. In some implementations, any action performed by control circuitry 204 may be based on instructions received from the personal assistant application.

In client-server based embodiments, control circuitry 204 may include communications circuitry suitable for communicating with a personal assistant server or other networks or servers. The instructions for carrying out the above-mentioned functionality may be stored on the personal assistant server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein. Nonvolatile memory may also be used (e.g., to launch a boot-up routine and other instructions). Cloud-based storage, described in relation to FIG. 3, may be used to supplement storage 208 or instead of storage 208.

Control circuitry 204 may include audio generating circuitry and tuning circuitry, such as one or more analog tuners, audio generation circuitry, filters or any other suitable tuning or audio circuits or combinations of such circuits. Control circuitry 204 may also include scaler circuitry for upconverting and downconverting content into the preferred output format of the smart speaker 200. Circuitry 204 may also include digital-to-analog converter circuitry and analog-to-digital converter circuitry for converting between digital and analog signals. The tuning and encoding circuitry may be used by the smart speaker device to receive and to display, to play, or to record content. The circuitry described herein, including for example, the tuning, audio generating, encoding, decoding, encrypting, decrypting, scaler, and analog/digital circuitry, may be implemented using software running on one or more general purpose or specialized processors. If storage 208 is provided as a separate device from smart speaker 200, the tuning and encoding circuitry (including multiple tuners) may be associated with storage 208.

A user 106 may utter instructions to control circuitry 204 which are received by microphones 212. The microphones 212 may be any microphones capable of detecting human speech. The microphones 212 are connected to processing circuitry 206 to transmit detected voice commands and other speech thereto for processing.

Smart speaker device 200 may optionally include a user input interface 210. User input interface 210 may be any suitable user interface, such as a remote control, mouse, trackball, keypad, keyboard, touch screen, touchpad, stylus input, joystick, or other user input interfaces. Display 212 may be provided as a stand-alone device or integrated with other elements of user equipment device 200. For example, display 212 may be a touchscreen or touch-sensitive display. In such circumstances, user input interface 210 may be integrated with or combined with microphones 212. When the interface 210 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, interface 210 may be HDTV-capable. In some embodiments, display 212 may be a 3D display, and the interactive media guidance application and any suitable content may be displayed in 3D.

Interface 210 may, for example, display the text of any audio emitted by the smart speaker 200. For instance, with reference to FIG. 1, when smart speaker 104 utters "I can't hear you right now", its display interface 210 may project those same words in written form, to increase the likelihood that user 106 perceives that a period of excessive volume is occurring.

Interface 210 may also be, or include, one or more illumination sources that act as indicators to users 106. These illumination sources may be indicator lights that are illuminated by control circuitry 204 to communicate particular states such as periods of high noise. The indicator lights and their operation are described further below.

Speakers 214 may be provided as integrated with other elements of user equipment device 200 or may be stand-alone units. Speakers 214 are connected to processing circuitry 206 to emit verbal responses to user 106 voice queries. More specifically, voice queries from a user 106 are detected my microphones 212 and transmitted to processing circuitry 206, where they are translated into commands according to personal assistant software stored in storage 206. The software formulates a query corresponding to the commands, and transmits this query to, for example, a search engine or other Internet resource over I/O path 202. Any resulting answer is received over the same path 202, converted to an audio signal by processing circuitry 206, and emitted by the speakers 214 as an answer to the voice command uttered by user 106.

Figure 3:
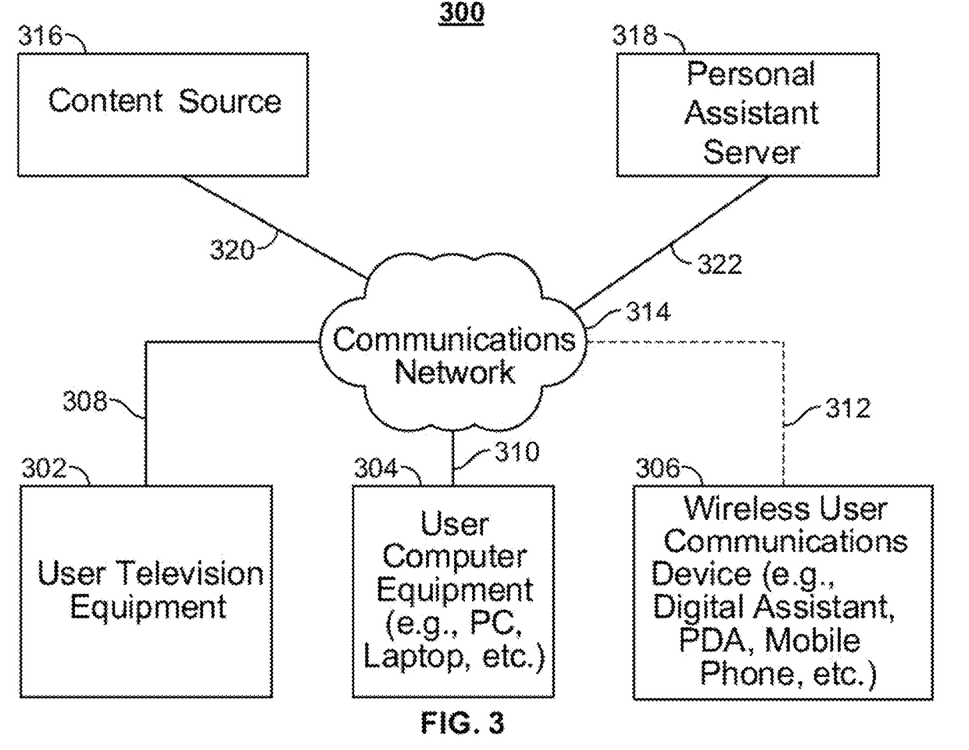
FIG. 3 is a block diagram representation of an exemplary electronic communication system within which the smart speaker of FIG. 2 operates.

Device 200 of FIG. 2 can be implemented in system 300 of FIG. 3 as user television equipment 302, user computer equipment 304, a wireless user communications device 306, or any other type of user equipment suitable for conducting an electronic search and displaying results thereof. For example, device 200 may be incorporated into content player 102, i.e., television 302. User equipment devices may be part of a network of devices. Various network configurations of devices may be implemented and are discussed in more detail below.

In system 300, there is typically more than one of each type of user equipment device but only one of each is shown in FIG. 3 to avoid overcomplicating the drawing. In addition, each user may utilize more than one type of user equipment device and more than one of each type of user equipment device.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths, if desired). Communications with the user equipment devices may be provided by one or more of these communications paths, but are shown as a single path in FIG. 3 to avoid overcomplicating the drawing.

Although communications paths are not drawn between user equipment devices, these devices may communicate directly with each other via communication paths, such as those described above in connection with paths 308, 310, and 312, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 314.

System 300 also includes content source 316, and personal assistant server 318. The content source 316 represents any computer-accessible source of content, such as a storage for the movies and metadata. The content source 316 may be the content server 100 of FIG. 1. The personal assistant server 318 may store and execute various software modules for implementing the personal assistant functionality of smart speaker 104. In some configurations, these modules may include natural language interface, information retrieval, search, machine learning, and any other modules for implementing functions of a personal assistant. Such modules and functions are known.

Figure 4:
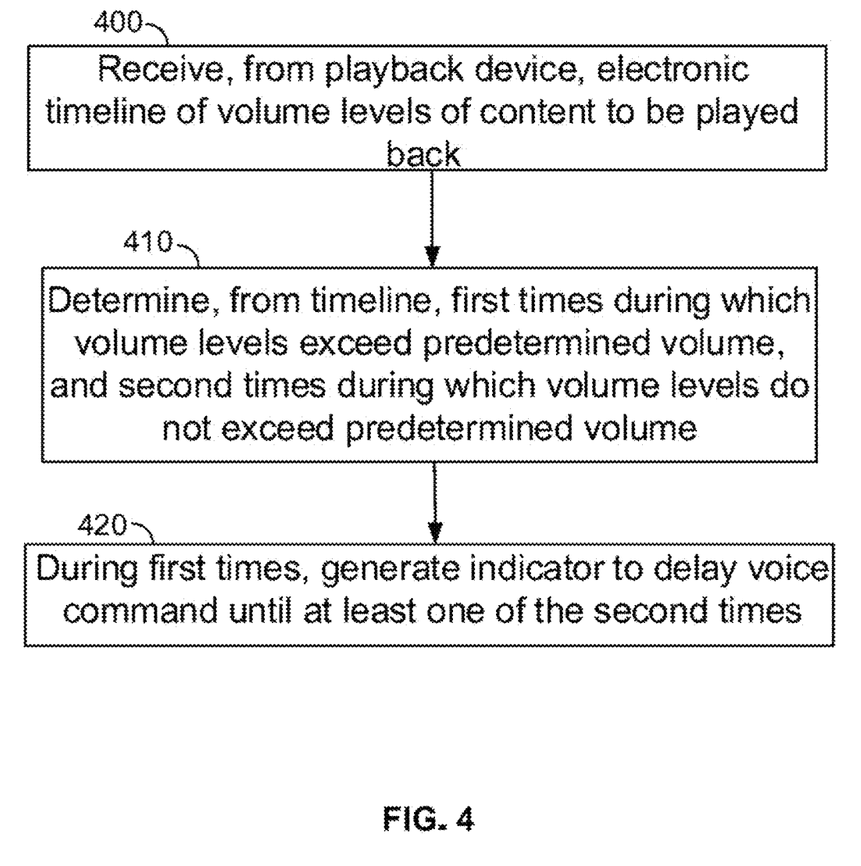
FIG. 4 is a flowchart illustrating process steps for smart speakers to determine periods of excessive noise for voice commands.

FIG. 4 is a flowchart illustrating process steps for smart speakers to determine periods of excessive noise for voice commands. Initially, a smart speaker 104 is positioned proximate to a content player 102, so that high volume content played by device 102 may potentially interfere with reception of voice commands at smart speaker 104. The smart speaker 104 receives an electronic timeline of volume levels of content being played by the content player 102 (Step 400). The electronic timeline may be transmitted from content player 102 to smart speaker 104 over communications network 314 via one or more communications paths 308, 310, 312.

From this electronic timeline, the smart speaker 104 determines first times during which volume levels of the content being played by content player 102 exceed some predetermined volume, and second times during which the volume levels do not exceed the predetermined volume (Step 410). That is, the smart speaker 104 determines those upcoming times during which content being played by content player 102 is sufficiently loud as to interfere with reception of voice commands, and those upcoming times during which it is not. During these first times, or times of loud content, the smart speaker 104 generates an indicator to the user 106 to delay his or her voice commands until at least one of the second times, or times of quieter content (Step 420).

The predetermined volume may be any criterion or set of criteria that can be used to estimate volume levels. For example, the above described first times, or times of loud content, may simply be those times during which the content being played exceeds some predetermined decibel level, e.g., 85 dB, or the approximate decibel level of a noisy restaurant. That is, the predetermined volume of Step 410 may be a single numerical value, such as a dB level above which it is deemed that content volume may interfere with voice commands. As another example, the predetermined volume of Step 410 may be an average volume over any time period. As yet another example, the predetermined volume may be a volume level or average volume level in a particular frequency range or ranges. Embodiments of the disclosure contemplate any numerical values of one or more criteria employed to determine the predetermined volume of Step 410.

One of ordinary skill in the art will realize that the electronic timeline may take any form, so long as volume levels and the corresponding times at which they are played are made available. For instance, the timeline of volume levels may be transmitted as part of the metadata transmitted to content player 102 to accompany the transmitted content. Alternatively, the timeline may be transmitted concurrent with the content as a separate stream. The disclosure contemplates any manner of transmitting information corresponding to volume levels and play times of displayed content.

One of ordinary skill in the art will also realize that, while the electronic timeline is described above as being transmitted to smart speaker 104 by the content player 102, the information of the timeline can be made available to the smart speaker 104 in any manner. As above, the electronic timeline may be transmitted to the content player 102 as part of, or separate from, the content being played. The content player 102 then forwards the electronic timeline to the smart speaker 104. Alternatively, the smart speaker 104 may receive the electronic timeline directly from the content source, e.g., content server 100 or content source 316, via I/O path 202 and communications network 314. As another alternative, the content server 100/content source 316 may simply store the timeline in its memory and make it available to the smart speaker 104 to retrieve. For example, content server 100/content source 316 may transmit a pointer, such as an address or location in memory, to the content player 102 along with the content stream, and player 102 may forward the pointer to the smart speaker 104. The pointer may point to the location of the electronic timeline on server 100/316. The smart speaker 104 may then retrieve the electronic timeline from the address and memory location of the pointer. Alternatively, the server 100/316 may transmit the pointer or other timeline location information to the smart speaker 104.

Finally, one of ordinary skill in the art will additionally realize that the indicator generated in Step 420 may be any indicator that informs or requests the user 106 to wait until a current loud volume period has passed before issuing a voice command. For instance, as shown in FIG. 1, the indicator of Step 420 may be an audible request broadcast from speakers 214 to wait until a quieter period before voicing a request. That is, the indicator may be any audible request or statement. Alternatively, the indicator may be text displayed on interface 210, informing the user 106 to wait for quieter times before issuing a voice command. The disclosure contemplates any text-based request or statement. The indicator may also be a physical indicator such as one or more light sources. For instance, interface 210 of smart speaker 104 may include a red light such as a light emitting diode (LED) that is illuminated during those loud periods determined in Step 410. The smart speaker 104 may also include another light, such as a green LED, that is illuminated during periods of low noise. The disclosure encompasses any visual indicator, including any one or more light sources for indicating loud periods and/or quieter periods. Additionally, any one or more indicators may be used in any combination, e.g., during loud periods the smart speaker may both audibly request the user 106 to issue his or her voice command later, and may also illuminate a red LED indicating that voice commands may not be reliably received at this time.

Figure 5:
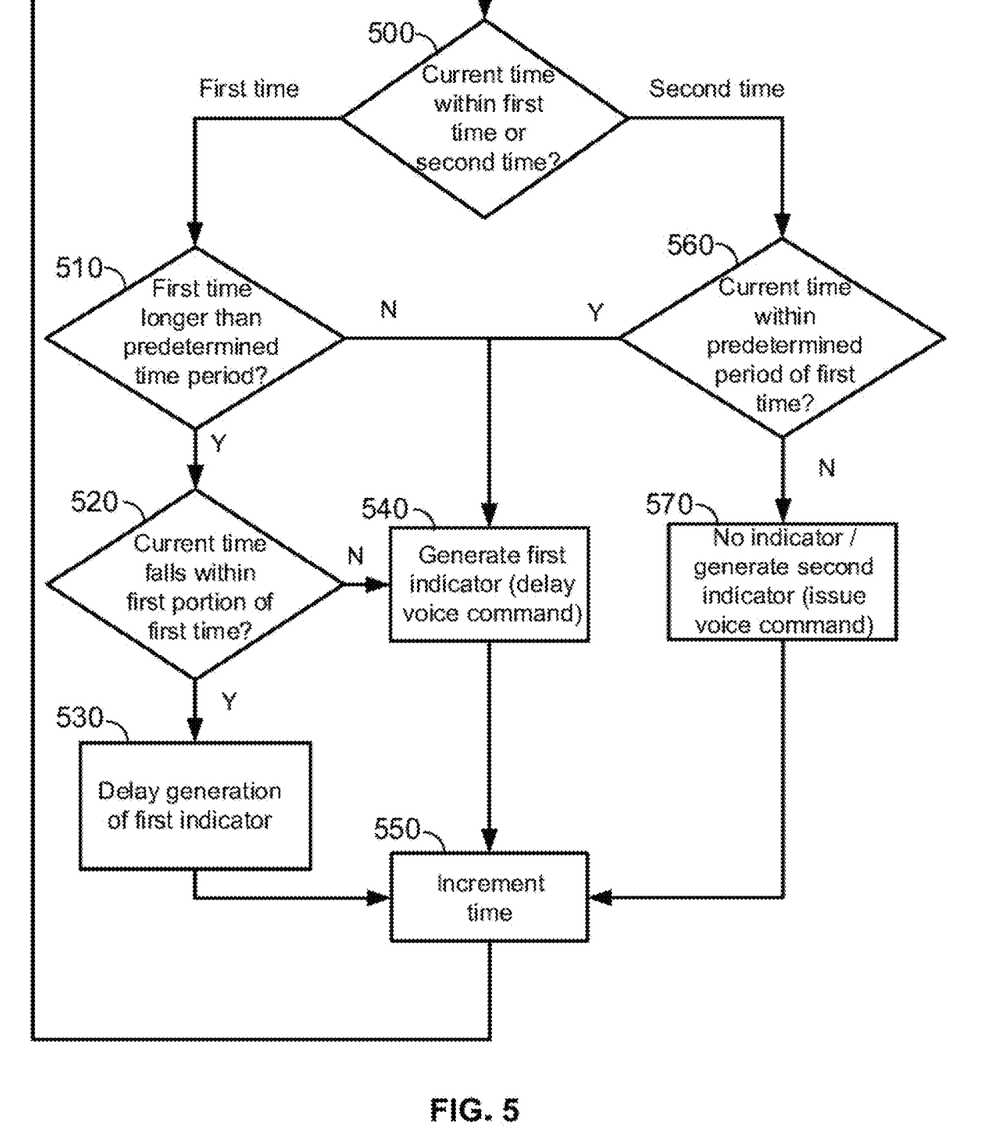
FIG. 5 is a flowchart illustrating process steps for smart speakers to inform users when to delay voice commands due to excessive noise.

In some embodiments, it is desirable for the smart speaker 104 to transmit the above described indicators at various times. That is, the excessive noise indicator(s) may be transmitted at other times besides only during high-noise periods, and the non-excessive noise indicator(s) may be transmitted at times different from simply lower-noise periods. FIG. 5 is a flowchart illustrating process steps for smart speakers to inform users when to delay voice commands due to excessive noise, and illustrates further details of the indicator generation of Step 420. At any given time, it is determined whether the current time is within a first period, i.e. a period of high volume as determined during Step 410, or a second period, i.e. a period of non-high volume (Step 500). If the current time is within a first period, then it is determined whether the first period is longer than a predetermined time period (Step 510). If so, and if the current time falls within a first portion of the first period (Step 520), then generation of the excessive noise (i.e., first) indicator is delayed (Step 530). In particular, users 106 may be annoyed if the smart speaker 104 allows no voice commands for too long of a time. Accordingly, to prevent user annoyance, the smart speaker 104 may allow voice commands during the first portion of a long noisy period, even though the high noise may interfere with voice commands at these times.

If the first period is not excessively long, or if it is but the current time does not fall within the first portion of the first period, then the smart speaker 104 generates the high noise (first) indicator as above, requesting the user to delay his or her voice command until the high noise period is over (Step 540). After Steps 530 and 540, the process continues by incrementing the current time (Step 550) and returning to Step 500.

If at Step 500 the current time is with a second period rather than a first period, then it is determined whether the current time is within a predetermined time of a first period (Step 560). That is, it is determined whether the current time is sufficiently close to an upcoming loud period. If so, the process proceeds to Step 540 and a loud noise indicator is generated. If not, no loud noise indicator is generated, and/or an indicator of low noise (i.e., second indicator) is generated (Step 570). That is, during low noise periods, a period of high noise may be approaching sufficiently soon that a voice command would likely be interrupted by the period of high noise before it can be completed. Thus, the high noise indicator may be generated even during a low noise period, if a high noise period is approaching soon. After Step 570, the process continues to Step 550, incrementing the current time and returning to Step 500.

Embodiments of the disclosure include any approach to the generation of these first and second indicators. The indicators may be generated simply during periods of high and low noise respectively, during the times as described above in connection with FIG. 5, or at any other times deemed appropriate. Similarly, the above described time periods may each be of any suitable duration. More specifically, the predetermined time period of Step 510, the first portion of Step 520, and the predetermined time of Step 560 may each be of any duration, e.g., any suitable number of seconds.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, periods of high volume may be determined in any manner, using any metrics, from an electronic timeline made available to the smart speaker 104 in any way. Also, any one or more indicators of any type may be employed by the smart speaker 104 to alert users to periods of high content volume. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method for indicating interference with smart speaker voice commands, the method comprising:
retrieving information identifying an electronic timeline of volume levels of content to be played by an electronic media device;
determining, from the electronic timeline of volume levels, first times during which the volume levels of the content exceed a predetermined volume, and second times during which the volume levels of the content do not exceed the predetermined volume;
during a presentation of the content on the electronic media device, receiving a voice command during the first times; and
in response to receiving the voice command during the first times, and based on the electronic timeline of volume levels, presenting an indicator on the electronic media device to delay the voice command.

2. The method of claim 1:
wherein the indicator is a first indicator; and
wherein the method further comprises, during the second times, presenting a second indicator to issue the voice command.

3. The method of claim 2, wherein the first indicator and the second indicator each comprise one or more of an audible instruction or a textual instruction.

4. The method of claim 2, further comprising generating the second indicator during a portion of the first times when the first times exceed a predetermined period of time.

5. The method of claim 1, wherein the indicator to delay the voice command is generated during a predetermined period prior to the first times.

6. The method of claim 1, wherein the indicator is an audible instruction.

7. The method of claim 6, wherein the audible instruction is an audible instruction to delay the voice command by a predetermined period of time.

8. The method of claim 1:
wherein the first times are time periods during which the volume levels of the content exceed the predetermined volume for less than a predetermined amount of time; and
wherein the second times are time periods during which the volume levels of the content do not exceed the predetermined volume, and time periods during which the volume levels of the content exceed the predetermined volume for more than the predetermined amount of time.

9. The method of claim 1, wherein the presenting the indicator further comprises selectively presenting the indicator during a later portion of the first times and not during an earlier portion of the first times.

10. The method of claim 9, wherein the selectively presenting the indicator further comprises selectively presenting the indicator during the later portion of the first times when the first times exceed a predetermined period of time.

11. The method of claim 9, wherein the selectively generating further comprises selectively generating the indicator during only a portion of the first times when the first times exceed a predetermined period of time.

12. The method of claim 1, wherein the electronic media device comprises the smart speaker.

13. A system for indicating interference with smart speaker voice commands, the system comprising:
- a storage device; and
- control circuitry configured to:
  - retrieve, from the storage device, information identifying an electronic timeline of volume levels of content to be played by an electronic media device;
  - determine, from the electronic timeline of volume levels, first times during which the volume levels of the content exceed a predetermined volume, and second times during which the volume levels of the content do not exceed the predetermined volume;
  - during a presentation of the content on the electronic media device, receive a voice command during the first times; and
  - in response to receiving the voice command during the first times, and based on the electronic timeline of volume levels, present an indicator on the electronic media device to delay the voice command.

14. The system of claim 13:
wherein the indicator is a first indicator; and
wherein the method further comprises, during the second times, presenting a second indicator to issue the voice command.

15. The system of claim 14, wherein the first indicator and the second indicator each comprise one or more of an audible instruction or a textual instruction.

16. The system of claim 14, the control circuitry is further configured to generate the second indicator during a portion of the first times when the first times exceed a predetermined period of time.

17. The system of claim 13, wherein the control circuitry is further configured to generate the indicator to delay the voice command during a predetermined period prior to the first times.

18. The system of claim 13, wherein the indicator is an audible instruction.

19. The system of claim 18, wherein the audible instruction is an audible instruction to delay the voice command by a predetermined period of time.

20. The system of claim 13:
wherein the first times are time periods during which the volume levels of the content exceed the predetermined volume for less than a predetermined amount of time; and
wherein the second times are time periods during which the volume levels of the content do not exceed the predetermined volume, and time periods during which the volume levels of the content exceed the predetermined volume for more than the predetermined amount of time.

* * * * *